(12) United States Patent
McCann

(10) Patent No.: US 7,246,690 B2
(45) Date of Patent: Jul. 24, 2007

(54) AIR DISC BRAKE ADJUSTER

(75) Inventor: Denis John McCann, Crickhowell (GB)

(73) Assignee: ArvinMeritor Technology, LLC, Troy, MI (US)

( * ) Notice: Subject to any disclaimer, the term of this patent is extended or adjusted under 35 U.S.C. 154(b) by 225 days.

(21) Appl. No.: 11/074,822

(22) Filed: Mar. 8, 2005

(65) Prior Publication Data
US 2006/0201755 A1 Sep. 14, 2006

(51) Int. Cl.
*F16D 65/56* (2006.01)
(52) U.S. Cl. .................................. 188/71.9; 188/71.8
(58) Field of Classification Search ............... 188/71.8, 188/71.9, 196 B, 196 BA, 196 D, 196 V
See application file for complete search history.

(56) References Cited

U.S. PATENT DOCUMENTS

| 3,111,198 | A | * | 11/1963 | Hodkinson | ................. | 188/71.9 |
| 3,146,861 | A | * | 9/1964 | Hodkinson | ................. | 188/71.9 |
| 3,392,806 | A | * | 7/1968 | Knapp | ....................... | 188/71.9 |
| 4,690,253 | A | * | 9/1987 | Weber | ....................... | 188/72.7 |
| 2004/0026181 | A1 | | 2/2004 | Baumgartner | | |
| 2004/0035650 | A1 | | 2/2004 | Baumgartner | | |
| 2004/0045776 | A1 | | 3/2004 | Baumgartner | | |
| 2004/0050630 | A1 | | 3/2004 | Baumgartner | | |
| 2004/0050635 | A1 | * | 3/2004 | Bieker et al. | ............... | 188/381 |

FOREIGN PATENT DOCUMENTS

EP    1 000 263 B1    6/2004
WO    WO02/14708    2/2002

* cited by examiner

*Primary Examiner*—Thomas Williams
(74) *Attorney, Agent, or Firm*—Carlson, Gaskey & Olds, P.C.

(57) ABSTRACT

An adjuster for an air disc brake assembly is used to drive tappet members on opposing sides of a rotating brake disc to adjust brake pad position in response to pad wear. The adjuster includes a one-way clutch that permits the tappet members to be driven for adjustment in a brake apply direction and prevents adjustment in a brake release direction. The adjuster includes an adjuster input shaft, which is actuated by a brake operating shaft, and an adjuster body that supports first and second adjuster members. The one-way clutch couples the adjuster input shaft to the adjuster body such that the first adjuster member drives a first tappet assembly to adjust a first brake pad on one side of the rotating brake disc, and the second adjuster member drives a second tappet assembly to independently adjust a second brake pad on an opposite side of the rotating brake disc.

20 Claims, 2 Drawing Sheets

AIR DISC BRAKE ADJUSTER

TECHNICAL FIELD

The subject invention generally relates to a brake pad wear adjuster for an air disc brake assembly, and more specifically relates to a brake pad wear adjuster that adjusts first and second brake pads relative to a rotating brake disc by independently actuating opposing tappets.

BACKGROUND OF THE INVENTION

An air disc brake assembly includes a first brake pad positioned on one side of a rotating brake disc and a second brake pad positioned on an opposite side of the rotating brake disc. The first and second brake pads are supported by a brake caliper that is mounted to a non-rotating vehicle structure. The brake caliper includes a brake housing having a main section and a bridge section. The main section defines a cavity that receives an actuating mechanism and the bridge section extends over the rotating brake disc. The actuating mechanism includes tappets that move the first brake pad into engagement with the rotating brake disc. Input from a brake operating shaft moves the tappets in response to a braking demand.

The brake housing straddles the rotating brake disc and is slidably mounted on a torque taking member with guide pins. Movement of the brake operating shaft causes the first brake pad to move into engagement with the rotating brake disc, and continued pressure causes the brake housing to slide on the guide pins relative to the torque taking member and rotating brake disc. This causes the bridge section of the housing to press on the second brake pad to move the second brake pad into engagement with the rotating brake disc.

One disadvantage with this traditional air brake configuration is that it cannot be used with some vehicle suspensions. For example, certain independent front suspensions do not have packaging space available to permit the use of a conventional sliding caliper. As the first and second brake pads wear, the brake caliper moves in an inboard direction. These types of suspensions are not capable of providing a sufficient area into which the brake caliper can move as the first and second brake pads wear.

Thus, there is a need for a disc brake assembly that actuates opposing brake pads and adjusts for brake pad wear without requiring a conventional sliding brake caliper.

SUMMARY OF THE INVENTION

An adjuster for a disc brake assembly utilizes a one-way clutch to independently adjust first and second brake pads in response to brake pad wear. The disc brake assembly includes a brake caliper that supports the first and second brake pads relative to a rotating brake disc. The first brake pad is positioned on one side of the rotating brake disc and the second brake pad is positioned on an opposite side of the rotating brake disc. A brake actuator moves the first brake pad into engagement with the rotating brake disc in response to a brake demand. The rotating brake disc can slide or have compliance and a force from the first brake pad causes the brake disc to be forced against the second brake pad.

The brake actuator includes a first tappet assembly that moves the first brake pad into engagement with the rotating brake disc for normal brake actuation. A second tappet assembly cooperates with the first tappet assembly to adjust brake pad position relative to the rotating brake disc in response to brake pad wear. The first and second tappet assemblies are positioned on opposing sides of the rotating disc and are interconnected by a bridge shaft. Adjustment actuation is transferred from the first tappet assembly to the second tappet assembly via the bridge shaft.

The adjuster includes an adjuster input shaft, which is actuated by the brake operating shaft, and an adjuster body that supports first and second adjuster members. The first adjuster member drives the first tappet assembly and the second adjuster member independently drives the second tappet assembly. A one-way clutch mechanism couples the adjuster input shaft to the adjuster body to provide adjustment in only one direction as the first and second brake pads wear.

In one example, the first and second adjuster members are first and second gears. The first gear drives the first tappet assembly and the second gear drives one end of the bridge shaft. An opposite end of the bridge shaft drives the second tappet assembly. First and second ball clutches cooperate with the first and second gears to allow slippage in a situation where one of the first and second brake pads requires more adjustment than the other of the first and second brake pads.

The subject actuating mechanism and adjuster provides efficient brake application and pad wear adjustment without utilizing a traditional sliding caliper. These and other features of the present invention can be best understood from the following specification and drawings, the following of which is a brief description.

DETAILED DESCRIPTION OF THE PREFERRED EMBODIMENT

Figure 1:
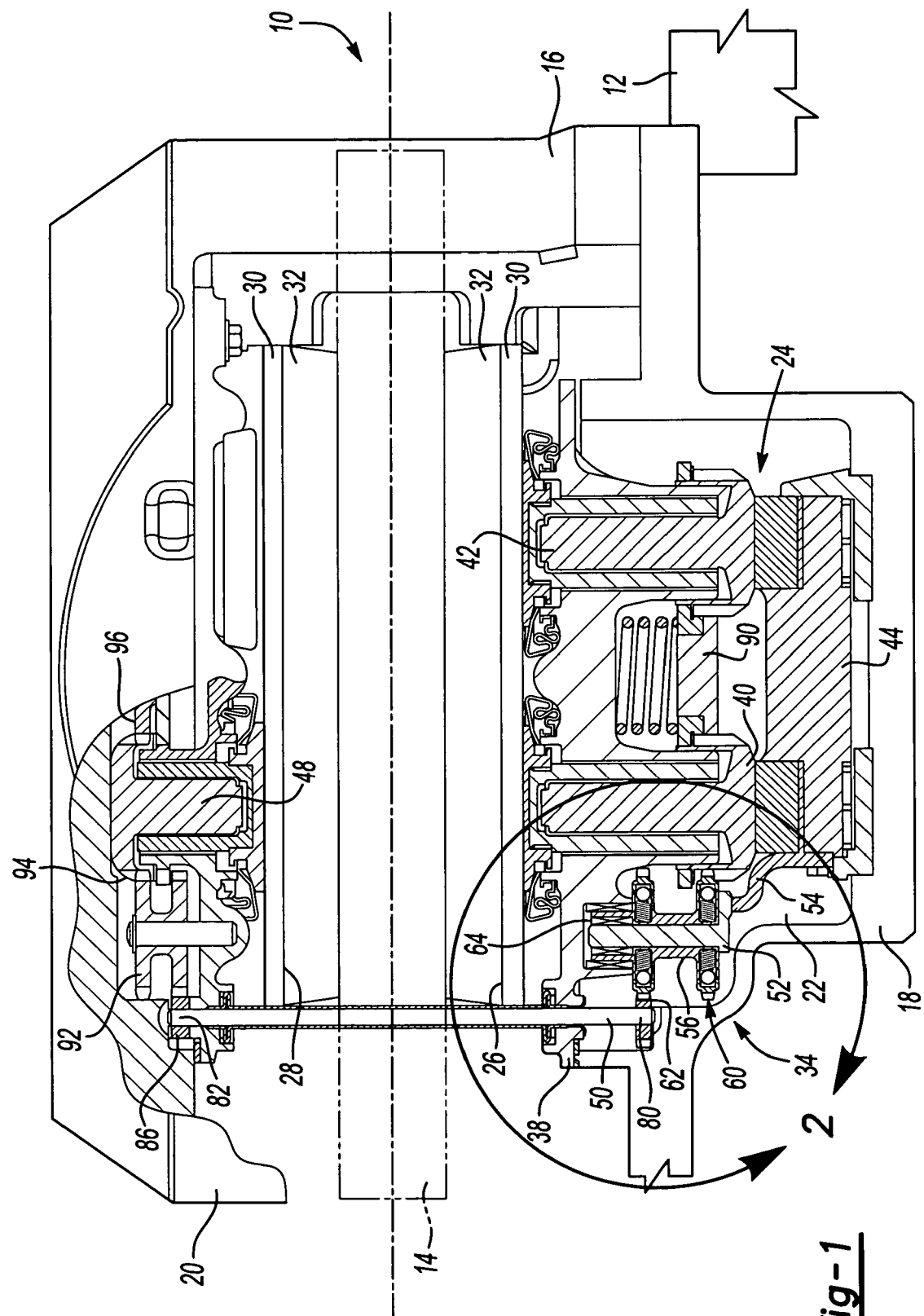
FIG. 1 is a top view of a disc brake assembly incorporating the subject invention.

FIG. 1 shows a brake assembly including a brake caliper 10 supported by a non-rotating vehicle structure, such as a suspension knuckle 12, and a rotor or disc 14 that rotates relative to the brake caliper 10. The brake caliper 10 includes a brake housing 16 having a main section 18 and a bridge section 20. The main section 18 and bridge section 20 can be formed as separate pieces or can be the same piece. The main section 18 includes a cavity 22 for receiving a brake actuator 24 and the bridge section 20 extends over the disc 14 such that the brake caliper 10 straddles the disc 14.

A first brake pad 26 is positioned on one side of the disc 14 and a second brake pad 28 is positioned on an opposite side of the disc 14. The first 26 and second 28 brake pads each include a back plate 30 and a brake lining 32 formed from a material that wears over time in response to successive brake actuations. An adjuster 34 adjusts the position of the first 26 and second 28 brake pads relative to the disc 14 as the brake lining 32 wears. The adjuster 34 thus provides a generally constant distance between a friction surface of the first 26 and second 28 brake pads and the disc 14 over time.

The brake housing 16 also includes a carrier plate 38 that substantially encloses the brake actuator 24 within the cavity 22. Preferably, the carrier plate 38 is positioned immediately adjacent to the main section 18 on the same side of disc 14 as the first brake pad 26.

The brake actuator 24 includes first 40 and second 42 tappet members that are positioned within the cavity 22. The first 40 and second 42 tappet members are actuated by a brake operating member 44 that moves the first 40 and second 42 tappet members to engage the first brake pad 26, which moves the first brake pad 26 into engagement with the disc 14. The brake operating member 44 is preferably a lever that pivots in response to a brake demand. The operation and configuration of the first 40 and second 42 tappet members is well-known in the art, and will not be discussed in further detail. One example of disc brake assembly utilizes tappet members is EP 1000263, "Improvement Relating to Disc Brakes," and which is assigned to the assignee of the subject invention, and which is herein incorporated by reference.

The first 40 and second 42 tappet members are positioned on the same side of disc 14 as the first brake pad 26. Another set of tappet members is positioned on the opposite side of the disc 14, i.e. another set of tappet members is positioned on the same side of the disc as the second brake pad 28. This set of tappet members includes a third tappet member 48 that is supported by the bridge section 20 of the brake housing 16. Preferably a fourth tappet member is also supported by the bridge section 20, adjacent to the third tappet member 48, however the fourth tappet member is not shown for clarity purposes.

A bridge shaft 50 interconnects the first tappet member 40 to the third tappet member 48. The bridge shaft 50 is supported at one end by the main section 18 and extends over the disc 14 to be supported at an opposite end in the bridge section 20. The adjuster 34 drives the first 40 and third 48 tappet members to adjust the position of the first 26 and second 28 brake pads relative to the disc 14 in response to pad wear.

Figure 2:
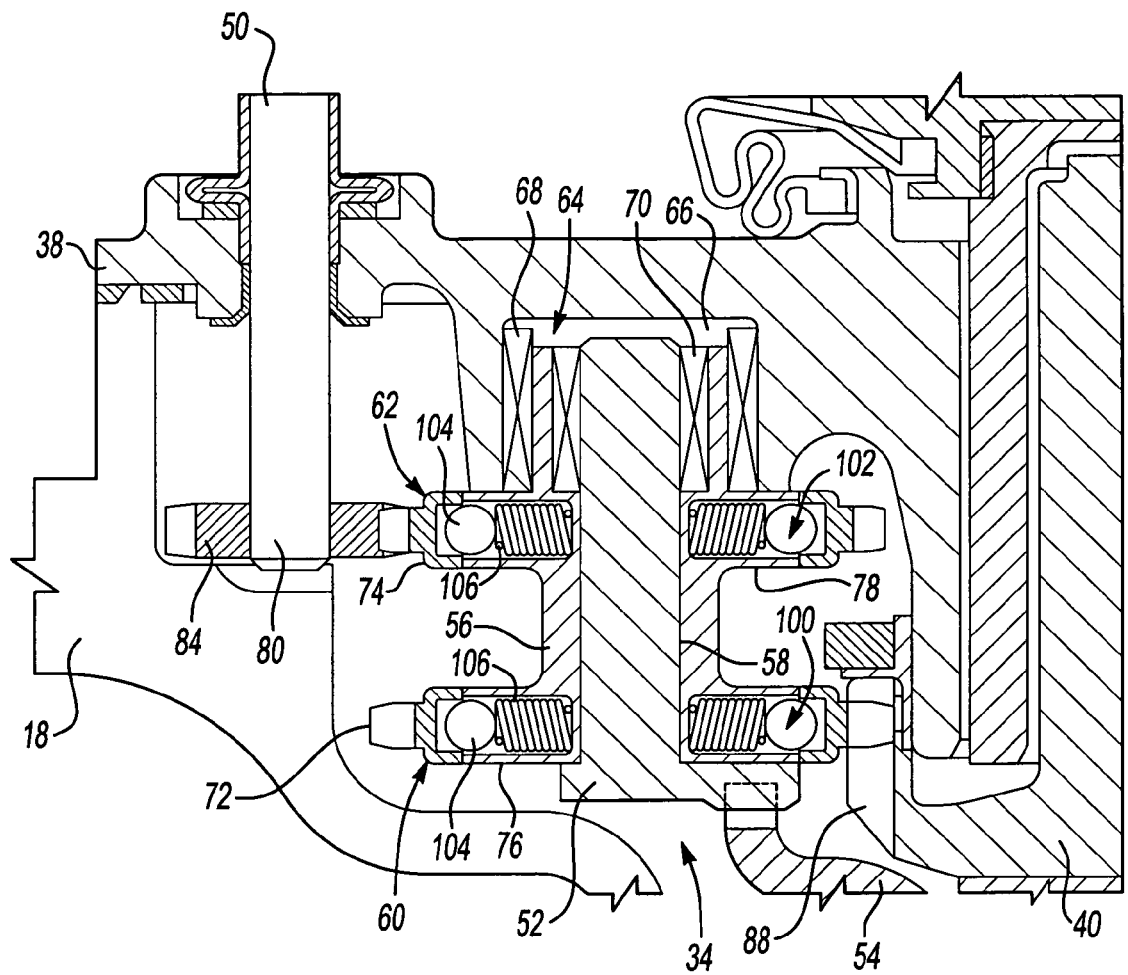
FIG. 2 is a magnified view of the area indicated at 2 in FIG. 1.

The adjuster 34 includes an adjuster input shaft 52 that is coupled to the brake operating member 44 with a lever 54. As shown in FIG. 2, the adjuster 34 also includes an adjuster body 56 with an internal bore 58 that receives the adjuster input shaft 52. A first adjuster member 60 is supported on the adjuster body 56 for driving the first tappet member 40 and a second adjuster member 62 is supported on the adjuster body 56 for driving the third tappet member 48 via the bridge shaft 50.

A clutch mechanism 64 couples the adjuster input shaft 52 to the adjuster body 56. The clutch mechanism 64 is a one-way clutch that allows pad adjustment in a brake apply direction but prevents any adjustment in a brake release direction. Preferably, the clutch mechanism 64 is a one-way sprag clutch.

In the example shown in FIG. 2, the clutch mechanism 64 is received within a recess 66 formed within the carrier plate 38. The clutch mechanism 64 includes a bushing 68 supported by carrier plate 38 and a clutch member 70. The bushing 68 is positioned between an outer surface of the adjuster body 56 and the carrier plate 38. The clutch member 70 is positioned between an outer surface of the adjuster input shaft 52 and the adjuster body 56. The clutch member 70 only transmits drive in one direction (the brake apply direction) This configuration achieves the desired one-way adjustment and provides independent adjustment of the first 26 and second 28 brake pads as the brake lining 32 wears.

In the example shown in FIG. 2, the first adjuster member 60 comprises a first gear 72 and the second adjuster member 62 comprises a second gear 74. The adjuster body 56 includes a first flange portion 76 and a second flange portion 78, which extend about an outer perimeter of the adjuster body 56. The first 76 and second 78 flange portions are generally parallel to each other and are axially spaced apart from each other along the adjuster body 56. The first flange portion 76 supports the first gear 72 and the second flange portion 78 supports the second gear 74.

The bridge shaft 50 includes a first end 80 positioned near the first brake pad 26 and a second end 82 (see FIG. 1) positioned near the second brake pad 28. The first end 80 supports a first shaft gear 84 and the second end 82 supports a second shaft gear 86. The first gear 72 of the adjuster 34 is in direct driving engagement with a toothed surface 88 formed about an outer perimeter of the first tappet member 40, and the second gear 74 of the adjuster 34 is in direct driving engagement with the first shaft gear 84 of the bridge shaft 50.

To adjust the position of the first brake pad 26, the first gear 72 drives the first tappet member 40. A spring and gear assembly 90 (FIG. 1) transfers the rotational input from the first tappet member 40 to the second tappet member 42. To adjust the position of the second brake pad 28, the second gear 74 drives the first shaft gear 84, which rotates the bridge shaft 50 and drives the second shaft gear 86. As shown in FIG. 1, the second shaft gear 86 drives an intermediary gear 92, which is in direct driving engagement with a toothed surface 94 formed about an outer perimeter of the third tappet member 48. The fourth tappet member (not shown) is driven by a transfer gear assembly 96, which is shown in part in FIG. 1, in a similar manner as that of the spring and gear assembly 90 that drives the second tappet member 42.

The first flange portion 76 includes a recess that receives a first clutch 100 and the second flange portion 78 includes a recess that receives a second clutch 102. The first 100 and second 102 clutches each include a plurality of ball members 104 (only one is shown for each clutch) and a biasing member 106, such as a spring. The first 100 and second 102 clutches cooperate with the one-way clutch mechanism 64 to provide independent adjustment of the first 26 and second 28 brake pads. If one of the first 26 and second 28 brake pads requires more adjustment than the other of the first 26 and second 28 brake pads, then one of the first 100 and second 102 clutches will allow slippage at a corresponding one of the first 60 and second 62 adjuster members until both of the first 26 and second 28 brake pads are fully adjusted.

One advantage with the subject brake assembly is that the brake assembly can be easily incorporated into independent front suspensions that are not capable of accommodating a traditional sliding caliper. To compensate for wear of the second brake pad 28 located at an outboard position relative to the disc 14, an outboard set of tappets (including the third tappet member 48) are provided in an outboard beam portion of the bridge section 20. As the brake lining 32 of the second brake pad 28 wears, the outboard set of tappets are wound out from an inboard side by the bridge shaft 50. The adjuster 34 includes the one-way clutch mechanism 64 that cooperates with the slipping first 100 and second 102 clutches to allow individual adjustment of the first 26 and second 28 brake pads.

On brake actuation, inboard running clearance is taken up as the first brake pad 26 is moved into contact with the disc 14. To take up outboard running clearance, and to allow for strain in the bridge section 20 during braking, the disc 14 is slightly movable axially in an outboard direction. The disc 14 can slide on splines (not shown) or can have some lateral compliance to provide the axial movement necessary to bring the second brake pad 28 into contact with the disc 14 to achieve braking.

Optionally, a fixed disc 14 could be used in combination with either brake mounting compliance or by mounting the brake assembly on short guide pins (not shown). Either option would provide the necessary float to provide the axial movement necessary to bring the second brake pad 28 into contact with the disc 14 to achieve braking.

The adjuster 34 is driven by the lever 54, which is attached to the adjuster input shaft 52 in a drive connection. During a brake application, the lever 54 is moved by the brake operating member 44 to rotate the adjuster input shaft 52. Backlash in this drive connection between the lever 54 and adjuster input shaft 52 provides running clearance once the brake assembly is released.

As discussed above, the combination of the one-way clutch mechanism 64, the first 60 and second 62 adjuster members, and the first 100 and second 102 clutches provides individual and independent adjustment of the first 26 and second 28 brake pads. During adjustment it does not matter which of the first 26 and second 28 brake pads makes first contact with the disc 14. For example, if the first brake pad 26 first contacts the disc 14, the first clutch 100 (that drives the first 40 and second 42 tappet members) slips but the second clutch 102 will continue to drive the third tappet member 48 via the bridge shaft 50. When both the first 26 and second 28 brake pads have contacted the disc 14 both the first 100 and second 102 clutches will be slipping. On release of the brake assembly, running clearance is provided by the backlash as explained above. Float of the disc 14 during driving will provide sufficient running clearance on both sides of the disc 14.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An adjuster for a vehicle brake assembly comprising:
   an adjuster input adapted for actuation by a brake operating input shaft;
   a first adjuster member adapted to drive a first tappet assembly positioned on one side of a rotating brake disc;
   a second adjuster member adapted to drive a second tappet assembly positioned on an opposite side of the rotating brake disc from the first tappet assembly; and
   a clutch mechanism that couples said adjuster input to said first and second adjuster members wherein said first adjuster member adjusts a position of a first brake pad relative to the one side of the rotating brake disc by driving the first tappet assembly and said second adjuster member independently adjusts a position of a second brake pad relative to the opposite side of the rotating brake disc by driving the second tappet assembly.

2. The adjuster according to claim 1 wherein said clutch mechanism comprises a one-way sprag clutch.

3. The adjuster according to claim 1 wherein said first tappet assembly is driven by said first adjuster member to adjust a position of the first brake pad relative to the one side of the rotating brake disc in response to brake pad wear and wherein said second tappet assembly is driven by said second adjuster member to independently adjust a position of the second brake pad relative to the opposite side of the rotating brake disc in response to brake pad wear.

4. An adjuster for a vehicle brake assembly comprising:
   an adjuster input adapted for actuation by a brake operating input shaft, wherein said adjuster input comprises an adjuster input shaft;
   a first adjuster member adapted to drive a first tappet assembly positioned on one side of a rotating brake disc, said first adjuster member comprisisng a first gear;
   a second adjuster member adapted to drive a second tappet assembly positioned on an opposite side of the rotating brake disc from the first tappet assembly, said second adjuster member comprising a second gear; and
   a clutch mechanism that couples said adjuster input to said first and second adjuster members wherein said first adjuster member adjusts a position of a first brake pad relative to the one side of the rotating brake disc by driving the first tappet assembly and said second adjuster member adjusts a position of a second brake pad relative to the opposite side of the rotating brake disc by driving the second tappet assembly.

5. The adjuster according to claim 4 including an adjuster body having a central bore that receives said adjuster input shaft, said adjuster body including a first mounting portion to support said first gear and a second mounting portion to support said second gear wherein said clutch mechanism couples said adjuster body to said adjuster input shaft.

6. The adjuster according to claim 5 wherein said adjuster input shaft, said first gear, and said second gear are concentric.

7. The adjuster according to claim 5 including a first ball clutch cooperating between said first gear and said adjuster body to provide slippage when the second brake pad requires more adjustment than the first brake pad and a second ball clutch cooperating between said second gear and said adjuster body to provide slippage when the first brake pad requires more adjustment than the second brake pad.

8. The adjuster according to claim 5 including a bridge shaft that couples the first tappet assembly to the second tappet assembly, said bridge shaft having a first shaft end driven by said second gear and a second shaft end that drives the second tappet assembly.

9. An air disc brake assembly comprising:
   a brake caliper;
   a brake disc supported for rotation relative to said brake caliper;
   a first brake pad supported by said brake caliper and positioned on one side of said brake disc;
   a second brake pad supported by said brake caliper and positioned on an opposite side of said brake disc from said first brake pad;
   a brake actuator including a first tappet assembly that moves said first brake pad into engagement with said brake disc, a second tappet assembly operably coupled to said second brake pad, and a bridge shaft coupling said first and second tappet assemblies to each other, said first tappet assembly being positioned on said one side of said brake disc and said second tappet assembly being positioned on said opposite side of said brake disc;
   a brake operating shaft operable to actuate said brake actuator to move said first and second brake pads into engagement with said brake disc in response to a braking demand; and
   an adjuster including an adjuster input shaft coupled to said brake operating shaft, an adjuster body supporting first and second adjuster members with said first adjuster member driving said first tappet assembly to adjust a position of said first brake pad relative to said one side of said brake disc in response to brake pad wear and said second adjuster member driving said second tappet assembly to adjust a position of said second brake pad relative to said opposite side of said brake disc in response to brake pad wear independently of said first adjuster member, and a clutch mechanism coupling said adjuster input shaft to said adjuster body.

10. The air disc brake assembly according to claim 9 wherein said brake caliper is fixed to a suspension knuckle.

11. The air disc brake assembly according to claim 9 wherein said brake caliper includes a brake housing having a main body portion defining a cavity for receiving said brake actuator, a bridge portion extending over said brake disc to support said bridge shaft, and a cover plate cooperating with said main body portion to substantially enclose said first tappet assembly within said cavity wherein said cover plate includes a recess that receives said clutch mechanism.

12. The air disc brake assembly according to claim 9 wherein said clutch mechanism comprises a one-way sprag clutch.

13. The air disc brake assembly according to claim 9 wherein said adjuster includes a gear drive that allows pad adjustment in a brake apply direction but prevents any adjustment in a brake release direction.

14. An air disc brake assembly comprising:
a brake caliper;
a brake disc supported for rotation relative to said brake caliper;
a first brake pad supported by said brake caliper and positioned on one side of said brake disc;
a second brake pad supported by said brake caliper and positioned on an opposite side of said brake disc from said first brake pad;
a brake actuator including a first tappet assembly that moves said first brake pad into engagement with said brake disc, a second tappet assembly operably coupled to said second brake pad, and a bridge shaft coupling said first and second tappet assemblies to each other, said first tappet assembly being positioned on said one side of said brake disc and said second tappet assembly being positioned on said opposite side of said brake disc;
a brake operating shaft operable to actuate said brake actuator to move said first and second brake pads into engagement with said brake disc in response to a braking demand; and
an adjuster including an adjuster input shaft coupled to said brake operating shaft, an adjuster body supporting first and second adjuster members with said first adjuster member driving said first tappet assembly to adjust a position of said first brake pad relative to said one side of said brake disc in response to brake pad wear and said second adjuster member driving said second tappet assembly to adjust a position of said second brake pad relative to said opposite side of said brake disc in response to brake pad wear, and a clutch mechanism coupling said adjuster input shaft to said adjuster body, wherein said adjuster body includes an internal bore that receives said adjuster input shaft and wherein said first and second adjuster members comprises first and second gears that are supported by an external surface of said adjuster body.

15. The air disc brake assembly according to claim 14 including a first ball clutch cooperating between said first gear and said adjuster body to provide slippage when said second brake pad requires more adjustment than said first brake pad and a second ball clutch cooperating between said second gear and said adjuster body to provide slippage when said first brake pad requires more adjustment than said second brake pad.

16. The air disc brake assembly according to claim 15 wherein said adjuster body includes a first flange portion formed about an outer perimeter of said adjuster body and a second flange portion formed about said outer perimeter, said first and said second flange portions being parallel to and spaced apart from each other and wherein said first ball clutch is received within said first flange portion to engage said first gear and said second ball clutch is received within said second flange portion to engage said second gear.

17. The air disc brake assembly according to claim 16 including a third gear mounted to one end of said bridge shaft and a fourth gear mounted to an opposite end of said bridge shaft, wherein said second gear directly drives said third gear and said fourth gear drives said second tappet assembly.

18. A method for adjusting first and second brake pads relative to a rotating disc in a brake assembly comprising the steps of:
(a) positioning a first set of tappets on one side of the rotating disc to actuate the first brake pad against the rotating disc in response to a brake demand;
(b) positioning a second set of tappets on an opposite side of the rotating disc from the first set of tappets;
(c) adjusting a position of the first brake pad relative to the one side of the rotating disc in response to brake pad wear by driving the first set of tappets via a wear adjuster; and
(d) independently adjusting a position of the second brake pad relative to the opposite side of the rotating disc in response to brake pad wear by driving the second set of tappets via the wear adjuster.

19. The method according to claim 18 including providing the wear adjuster with a first gear for driving the first set of tappets and a second gear for driving the second set of tappets, and an adjuster body for supporting the first and second gears;
connecting the first set of tappets to the second set of tappets with a bridge shaft;
driving the first set of tappets with the first gear;
driving the bridge shaft with the second gear; and
driving the second set of tappets with the bridge shaft.

20. The method according to claim 19 including coupling the adjuster body to an adjuster input shaft with a one-way clutch mechanism.

* * * * *